United States Patent [19]

Pori

[11] 3,786,190

[45] Jan. 15, 1974

[54] TELEMETERING SYSTEM FOR MULTI-CHANNEL DATA OVER VOICE GRADE TELEPHONE LINES

[75] Inventor: John R. Pori, Novato, Calif.

[73] Assignee: Parallel Data Systems, San Francisco, Calif.

[22] Filed: Dec. 23, 1971

[21] Appl. No.: 211,221

[52] U.S. Cl. ......... 179/2 DP, 179/15 FD, 332/16 R, 332/29 M, 329/110

[51] Int. Cl. ......... H04m 11/06

[58] Field of Search ......... 179/2 DP, 2 R, 15 FD; 178/66 R; 340/170, 171 R, 207 R, 182, 184; 332/16 R, 16 T, 29 M, 29 R, 21, 28; 329/110, 112, 140; 325/30, 47, 145, 344, 349

[56] References Cited

UNITED STATES PATENTS

| | | | |
|---|---|---|---|
| 3,465,103 | 9/1969 | Lynch | 340/207 R |
| 2,520,621 | 8/1950 | Beers | 329/140 |
| 3,096,401 | 7/1963 | Chaney | 340/207 R |
| 3,199,051 | 8/1965 | Hills | 332/16 T |
| 2,850,631 | 9/1958 | Tillman | 332/16 T |
| 2,919,416 | 12/1959 | Jones | 332/16 T |
| 3,426,150 | 2/1969 | Tygart | 179/2 DP |
| 3,199,508 | 8/1965 | Roth | 340/207 R |
| 3,434,151 | 3/1969 | Bader | 179/2 R |
| 3,603,881 | 9/1971 | Thornton | 325/30 |
| 3,426,151 | 2/1969 | Tygart | 179/15 FD |

*Primary Examiner*—Kathleen H. Claffy
*Assistant Examiner*—Thomas D'Amico
*Attorney*—Flehr, Hohbach, Test, Albritton & Herbert

[57] ABSTRACT

A telemetering system for multi-channel data such as EEG data where eight channels of such data are frequency modulated by eight different carrier frequencies and transmitted over a telephone line pair and then filtered and demodulated. The demodulator for each channel includes only a single inductor which is matched with the modulator inductor.

1 Claim, 6 Drawing Figures

TELEMETERING SYSTEM FOR MULTI-CHANNEL DATA OVER VOICE GRADE TELEPHONE LINES

BACKGROUND OF THE INVENTION

The present invention is directed to a telemetering system for multi-channel data and more specifically to a system for transmitting eight channel electroencephalographic (EEG) data over a voice quality telephone line pair.

With the advent of heart/lung machines and other life prolonging techniques, it has become increasingly necessary to make a determination of death by ascertaining the absence of brain waves. This may be especially important where the assumedly deceased is a potential organ donor. When the patient was in an outlying area in the past it has been necessary to transmit the EEG by bus to a fully staffed medical facility for interpretation of the EEG. This time delay caused the deceased family emotional strain and financial hardship.

Six channel electroencephalograms have been successfully transmitted over two conventional telephone lines with three channels per telephone line. This system used typical data sets provided by Western Electric. The foregoing system somewhat limits the diagnostic benefits available from an eight channel EEG. In addition, the use of two telephone lines is more expensive than one. Finally, the above six channel system was susceptible to intermodulation distortion which might in some cases produce excess error in the EEG readout.

OBJECTS AND SUMMARY OF THE INVENTION

It is, therefore, a general object of the present invention to provide an improved multi-channel telemetering system.

It is another object to provide a multi-channel system which operates over a single voice quality communications channel.

It is another object of the invention to provide a system as above which transmits multi-channel data with very low distortion.

In accordance with the above objects there is provided a telemetering system for multi-channel data where the transmission medium is a single voice quality communications channel. Frequency modulation means are provided for receiving the multi-channel data such means including in each channel a single inductor in combination with capacitor means for providing a unique carrier frequency for each data channel which is frequency modulated by the data. Means couple the frequency modulation means to the communications channel. Phase detector means are coupled to the communication channel for demodulating the signal transmitted by the channel. The phase detector means include a plurality of circuits resonant at each of the carrier frequencies. Each resonant circuit has an inductor identical to the inductor in the corresponding channel of the frequency modulation means.

DETAILED DESCRIPTION OF THE PREFERRED EMBODIMENT

Figure 1:
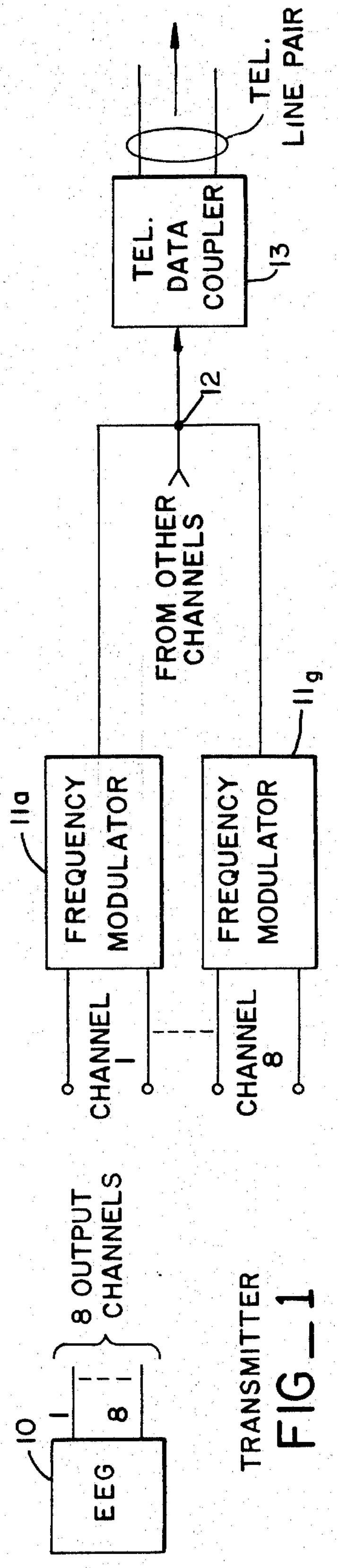
FIG. 1 is a block diagram of the transmitter portion of the system of the present invention.

Referring now to FIG. 1, the transmitter portion of the present invention is adapted to receive eight output channels from an EEG machine 10 connected to a patient. Each output channel is coupled into frequency modulators 11*a* through 11*g*. Each frequency modulator receives the low frequency data from its respective EEG output channel and this data modulates a unique carrier frequency produced by the frequency modulator for that channel. All of the frequency modulators are tied together at a point 12 which is then coupled to a telephone line pair through a standard telephone data coupler 13. For example, one type of data coupler is produced by Western Electric Company under number model 1000A.

Figures 2, 5, 6:
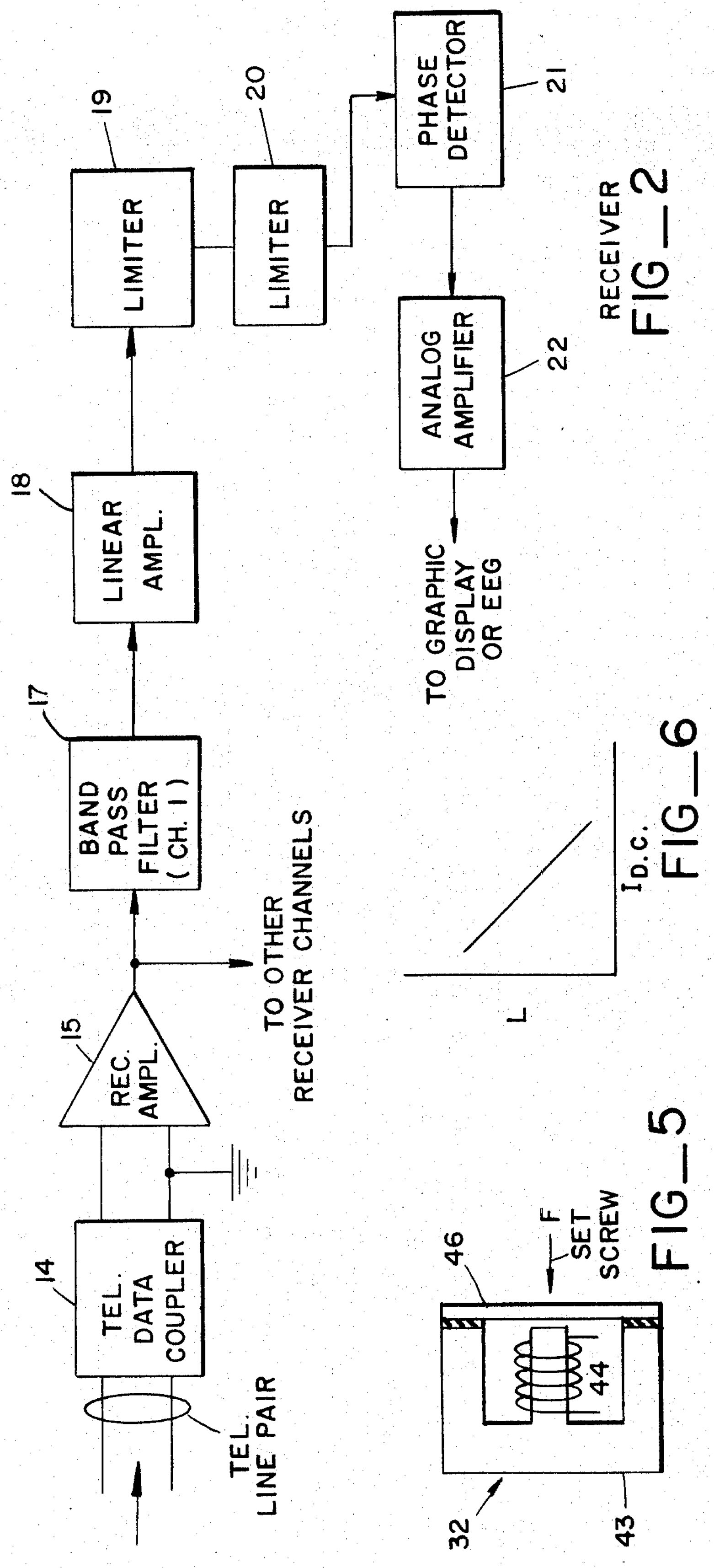
FIG. 2 is a block diagram of the receiver portion of the system.
FIG. 5 is a simplified plan view of one of the components of the present invention.
FIG. 6 is a curve useful in understanding the operation of the component of FIG. 5.

After being transmitted over the telephone line pair the data is received by a receiver illustrated in FIG. 2 which includes a telephone coupler 14 and a receiver amplifier 15. The output of receiver amplifier 15 is coupled to eight receiver channels; one for each of the original output channels of the EEG machine 10. Channel 1 is illustrated in FIG. 2 and includes a bandpass filter 17 which has a bandwidth of approximately 170 Hz. The output of the filter 17 is coupled through a linear amplifier 18 which in turn has its output coupled to series connected limiters 19 and 20. The output of limiter 20 is coupled to a phase detector 21 which demodulates the frequency modulated signal. The demodulated data signal is then coupled to an analog amplifier 22 which is connected to the graphic inputs of an EEG machine or similar device.

In general, the bandpass filter 17 has a sharp 60 db rolloff at its 170 Hz points and provides an essentially flat characteristic for low distortion. The linear amplifier in combination with the two limiters 19 and 20 also provides for low distortion as will be discussed in greater detail below.

Figures 3, 4:
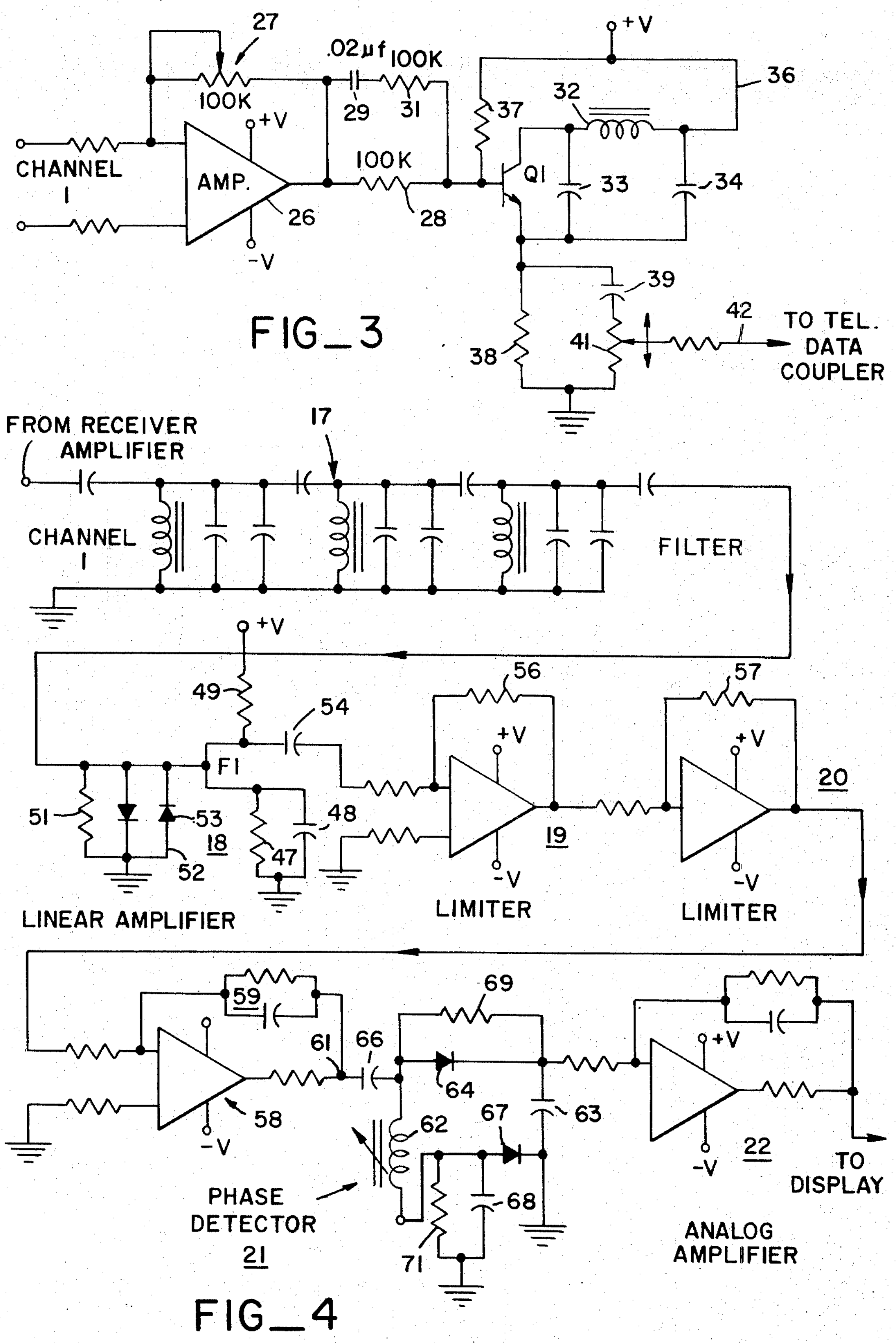
FIG. 3 is a circuit schematic of one channel of FIG. 1.
FIG. 4 is a circuit schematic of one channel of FIG. 2.

FIG. 3 illustrates frequency modulator 11a of FIG. 1 in greater detail. The modulator includes an amplifier 26 which is a type 741 operational amplifier. This includes ± V voltage inputs and an adjustable feedback network 27 which adjusts the signal level at the output of the amplifier. The output of amplifier 26 is coupled to the base input of a transistor Q1 through a resistor 28. Also coupled across the resistor are series connected capacitor 29 and a resistor 31.

Transistor Q1 has an inductive-capacitive circuit connected across its emitter and collector which is tuned to the particular carrier frequency of channel 1. The circuit includes an inductor 32 connected between the collector of Q1 and a +V voltage source and capacitors 33 and 34 which are tied together at the emitter of Q1 and having their opposite ends across inductor 32. Line 36 coupled to inductor 32 and the base of Q1 through a resistor 37 provides biasing. Feedback to cause the circuit to oscillate at a predetermined carrier frequency is provided by capacitor 33 coupled between the collector and emitter of Q1. This frequency is, of course, determined by the values of inductor 32 an capacitors 33 and 34. For each channel the capacitance value of capacitors 33 and 34 is modified to provide a unique carrier frequency for that channel. A resistor 38 connected between the emitter of Q1 and ground biases the transistor. An a.c. bypass capacitor 39 and series connected potentiometer 41 are also connected between the emitter and ground to provide an output on line 42 which is coupled to data coupler 13 (FIG. 1).

The actual mechanical construction of inductor 32 is shown in FIG. 5. It includes an E-shaped frame 43 of magnetically permeable material along with a winding 44 on the middle leg of the E. The value of the inductance may be adjusted by changing the magnetic reluctance between the upper and lower legs and the middle leg of the E. This is provided by a bridge 46 of magnetically permeable material where the gap between the middle leg of the E and the bridge may be adjusted by a set screw indicated at F. Another characteristic of an inductor of this type is illustrated in FIG. 6; that is, the d.c. current through the winding 44 will cause a linear change in inductance.

The foregoing phenemenon is used to advantage in causing the oscillator which includes Q1 to act as a frequency modulator. Specifically, a variation of the data signal at the base of Q1 causes a change of collector current of Q1. This change in turn varies the inductance value of inductor 32 to thus change the resonant frequency in the oscillator circuit. Thus, the transistor Q1 is responsive to data from a channel to change the d.c. current to the inductor 32 in accordance with the signal amplitude of the data on its base input. It thereby frequency modulates the carrier frequency in accordance with the amplitude of the input data. Since as illustrated in FIG. 6 the transfer function is substantially linear a very linear frequency modulation is produced. Thus, production of harmonics is prevented which might result in later intermodulation distortion between the various channels. In addition, the oscillator as constructed above is very stable because of the use of an inductor compared to an R-C circuit.

One type of inductor as illustrated in FIG. 5 which has been successfully used is manufactured by the United Transformer Corporation under the trademark VIC VARIDUCTOR.

The detailed circuit schematic of the receiver illustrated in FIG. 4 includes the filter 17 having a plurality of LC sections. As discussed above, the filter has a 170 Hz bandwidth with a sharp 60 db rolloff. The parallel capacitors of the filter shift the center frequency to the proper channel whereas the series capacitors control bandwidth and provide an insertion loss. The inductors may be of the wound toroidal type having a high Q. A suitable type is designated MQE manufactured by United Transformer Corporation.

Linear amplifier 18 which provides for low harmonic distortion includes a field effect transistor F1 whose source is biased by a resistor 47 which is shunted to ground by a bypass capacitor 48. The drain is coupled to a load resistor 49 which in turn is connected to a +V voltage source. The base of F1 is biased by a resistor 51 coupled between base and ground which has shunting it protective back-to-back diodes 52 and 53. The output of linear amplifier 18 which occurs on the drain of F1 is coupled through a coupling capacitor 54 to the input of limiter 19. Both limiters 19 and 20 includes type 741 operational amplifiers with feedback resistors 56 and 57, respectively. These limiters provide limiting with almost no distortion. Also the use of a field effect transistor provides significant linearity.

The output of limiter 20 is coupled to the input amplifier 58 of phase detector 21. This amplifier utilizes a type 741 operational amplifier as its basic building block with a parallel RC feedback circuit 59 coupling the output back to the input. Output terminal 61 of amplifier 58 has a relatively low impedance to provide effective sourcing and sinking of currents.

The phase shift discriminator portion of the phase detector includes an inductor 62 which is identical to the inductor 32. Its inductance value is adjusted for the particular center frequency of the channel with which it is associated. Tuning is, of course, accomplished by variation of the set screw F as illustrated in FIG. 5. The demodulated signal is developed across a load capacitor 63 which is coupled to the input of the analog amplifier 22 which in turn has its output coupled to the graphic display or EEG machine. Amplifier 22 includes as a basic building block the operational amplifier of the 741 type.

First diode means in the form of a diode 64 coupling one side of load capacitor 63 to a coupling capacitor 66 which couples to the low impedance output point 61 of amplifier 58. Second diode means in the form of diode 67 couples the other side of load capacitor 63 to the coupling capacitor through inductor 62. A balancing capacitor 68 coupled between ground and inductor 62 forms a resonant series circuit in combination with inductor 62 and coupling capacitor 66 which is resonant at the carrier frequency of channel 1. D.C. restoration of coupling capacitor C2 is provided by a resistor 69 connected between the coupling capacitor 66 and the relatively low impedance input of analog amplifier 22 and a resistor 71 connected between ground and inductor 62. The values of resistor 69 and 71 are substantially identical.

The capacitor 68 balances the a.c. impedance of the portion of the circuit including resistor 69 and diode 64 by the transformation action of the series resonant circuit formed by inductor 62 and coupling capacitor 66. This, thus, equalizes the a.c. impedance of the two branches. Specifically, the transformation action of the series resonant circuit causes a phase reversal and thus the diode 67 is connected in the same direction as the diode 64 to further provide for equal currents in the diodes to cause a zero output signal on load capacitor 63 when the input frequency to the phase detector is identical to its assigned carrier frequency. Variation from this center carrier frequency causes a shift in the center frequency in one direction or the other and causes a relative difference in currents through diodes 64 and 67 to thus provide an amplitude representation of this frequency shift and thus demodulate the frequency modulated signal.

The low output impedance point 61 is necessary since this output impedance in effect is part of the series resonant circuit which includes capacitors 66 and 68 and inductor 62. This resistance value must be relatively low to provide a reasonably high Q; otherwise the circuit would not resonate. By relatively low, means of the order of 50 ohms.

Capacitor 63 is discharged through the analog amplifier 22 which has a low imput impedance. The phase detector 21 by means of capacitors 63 and 66 and resistors 69 and 71 also acts as a filter of the bandpass type. In other words, frequencies in the present embodiment of greater than 100 Hz are severely attentuated. This serves to enhance channel separation.

But most importantly, matching of the inductor 62 to the inductors 32 of the receiver of FIG. 3 by using identical devices makes it extremely easy to match the carrier frequencies of the transmit and receive channels. In addition, of course, costs are reduced.

The following is a list of carrier frequencies which have been successfully used for the transmission of eight channel EEG data.

| Channel | Frequency Hz |
|---|---|
| 1 | 1400 |
| 2 | 1592 |
| 3 | 1830 |
| 4 | 2013 |
| 5 | 2196 |
| 6 | 2429 |
| 7 | 2630 |
| 8 | 3009 |

It is apparent from examination of the foregoing table that the carrier frequencies extend from substantially 1,400 Hz to 3,000 Hz. The values which were selected provide for the minimum harmonic relations. In addition, the use of the upper half of the frequency bandwidth of a typical voice quality telephone line also lowers the possibility of intermodulation distortion. Furthermore, the lower frequency bandwidth of 300–1,400 Hz is now available for simultaneous voice transmission.

Thus, the present invention has provided an improved multi-channel telemetering system. The highly linear FM modulator and demodulator portions of the system allows eight channels to be transmitted simultaneously on one voice quality communications channel such as a telephone line pair. This is achieved in part by the modulation technique using a variation of d.c. current in an inductor to change the resonant frequency, in part by the matching of inductors in the modulator and demodulator circuits, and in part by the unique phase detector configuration.

I claim:

1. A telemetering system for multi-channel data where the transmission medium is a single voice quality communications channel said system comprising: frequency modulation means for receiving said multichannel data such means including in each channel a single inductor coupled with capacitor means forming a resonant circuit and tuned for providing a unique carrier frequency for each data channel said modulation means being frequency modulated by said data and also including a transistor for each channel with said resonant circuit being connected across its emitter and collector and tuned to a carrier frequency, such circuit including fixed d.c. biasing means for said base and including said single inductor which responds to a change of d.c. current through it to change its inductance value, said base of said transistor being responsive to data from a channel and being direct coupled to said channel to change said d.c. current in accordance with the signal magnitude of said data whereby said carrier frequency is frequency modulated by said data, means for coupling said frequency modulation means to said communications channel, phase detector means adapted for being coupled to said communications channel for demodulating said signal transmitted by said channel said phase detector means including a plurality of circuits resonant at each of said carrier frequencies each resonant circuit having an inductor identical with respect to electrical characteristics to said inductor in the corresponding cannel of said frequency modulation means.

* * * * *